United States Patent
Maeto (10) Patent No.: US 11,545,183 B2
(45) Date of Patent: Jan. 3, 2023

(54) MAGNETIC DISK DEVICE AND READ PROCESSING METHOD

(71) Applicants: Kabushiki Kaisha Toshiba, Tokyo (JP); Toshiba Electronic Devices & Storage Corporation, Tokyo (JP)

(72) Inventor: Nobuhiro Maeto, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 105 days.

(21) Appl. No.: 17/197,283

(22) Filed: Mar. 10, 2021

(65) Prior Publication Data

US 2022/0076701 A1    Mar. 10, 2022

(30) Foreign Application Priority Data

Sep. 9, 2020  (JP) .............................. JP2020-151367

(51) Int. Cl.
    *H03M 13/00*  (2006.01)
    *G11B 20/18*  (2006.01)
    *G11B 19/04*  (2006.01)
    *G06N 3/08*  (2006.01)

(52) U.S. Cl.
    CPC ........... *G11B 20/1833* (2013.01); *G06N 3/08* (2013.01); *G11B 19/045* (2013.01); *G11B 2020/185* (2013.01); *G11B 2020/1863* (2013.01)

(58) Field of Classification Search
    CPC ........ G06K 9/6277; G06N 3/08; G06N 20/00; G11B 19/045; G11B 20/1833; G11B 20/10287; G11B 2020/185; G11B 2020/1863; G11C 11/416
    USPC .......................................................... 714/755
    See application file for complete search history.

(56) References Cited

U.S. PATENT DOCUMENTS

| | | | | |
|---|---|---|---|---|
| 5,699,487 | A * | 12/1997 | Richardson | G11B 5/09 |
| 6,212,664 | B1 * | 4/2001 | Feygin | H03M 13/39 |
| | | | | 714/795 |
| 8,775,913 | B2 * | 7/2014 | Haratsch | G11C 13/004 |
| | | | | 714/773 |
| 9,117,485 | B2 * | 8/2015 | Ogawa | G11B 7/005 |
| 9,117,495 | B2 | 8/2015 | Siau et al. | |
| 2002/0154434 | A1 * | 10/2002 | Satoh | G11B 5/012 |
| 2004/0080863 | A1 * | 4/2004 | Nakagawa | G11B 5/5547 |
| | | | | 360/78.08 |
| 2014/0032996 | A1 * | 1/2014 | Maeto | H03M 13/1111 |
| | | | | 714/780 |

(Continued)

FOREIGN PATENT DOCUMENTS

JP            2010-73264 A        4/2010

*Primary Examiner* — Samir W Rizk
*Assistant Examiner* — Enamul M Kabir
(74) *Attorney, Agent, or Firm* — Allen & Overy LLP (57) ABSTRACT

According to one embodiment, a magnetic disk device includes a disk, a head that writes data to the disk and reads data from the disk, and a controller that corrects a first signal into a first likelihood value by machine learning based on a correct learning signal set with a likelihood other than 1 and an incorrect learning signal set with a likelihood other than 0 and executes error correction processing based on a second likelihood value according to the first signal and the first likelihood value.

20 Claims, 10 Drawing Sheets

(56) References Cited

U.S. PATENT DOCUMENTS

| | | | |
|---|---|---|---|
| 2015/0003225 A1* | 1/2015 | Ogawa | G11B 20/10268 |
| | | | 369/47.17 |
| 2016/0065315 A1* | 3/2016 | Koike-Akino | H04B 10/6165 |
| | | | 398/208 |
| 2019/0385094 A1* | 12/2019 | Alex | G06N 20/20 |
| 2020/0090691 A1* | 3/2020 | Tagami | G11B 5/59655 |
| 2020/0099401 A1* | 3/2020 | Qin | H03M 13/1111 |
| 2020/0389188 A1* | 12/2020 | Belzer | G06N 3/04 |
| 2021/0110241 A1* | 4/2021 | Tullberg | G06N 3/04 |

\* cited by examiner

MAGNETIC DISK DEVICE AND READ PROCESSING METHOD

CROSS-REFERENCE TO RELATED APPLICATIONS

This application is based upon and claims the benefit of priority from Japanese Patent Application No. 2020-151367, filed Sep. 9, 2020, the entire contents of which are incorporated herein by reference.

FIELD

Embodiments described herein relate generally to a magnetic disk device and a read processing method.

BACKGROUND

A magnetic disk device is mounted with a Soft Output Viterbi Algorithm (SOVA) and a Low Density Parity Check (LDPC). The magnetic disk device executes error correction processing by the LDPC based on the likelihood calculated by Viterbi decoding processing by SOVA.

DETAILED DESCRIPTION

In general, according to one embodiment, a magnetic disk device comprises: a disk; a head that writes data to the disk and reads data from the disk; and a controller that corrects a first signal into a first likelihood value by machine learning based on a correct learning signal set with a likelihood other than 1 and an incorrect learning signal set with a likelihood other than 0 and executes error correction processing based on a second likelihood value according to the first signal and the first likelihood value.

Hereinafter, embodiments will be described with reference to the drawings. Incidentally, the drawings are an example, and do not limit the scope of the invention.

Embodiment

Figure 1:
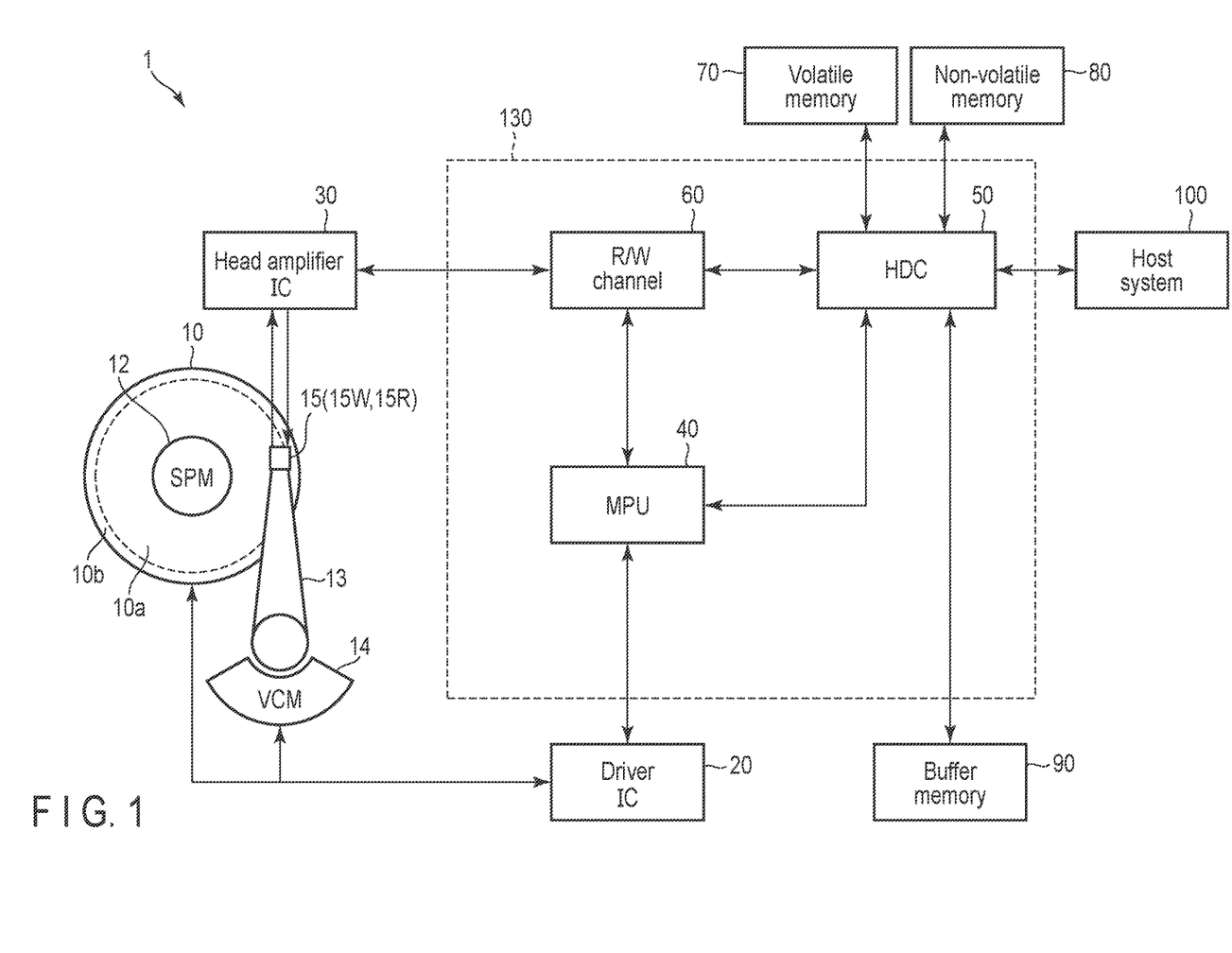
FIG. 1 is a block diagram illustrating a configuration of a magnetic disk device according to an embodiment.

FIG. 1 is a block diagram illustrating a configuration of a magnetic disk device 1 according to an embodiment.

The magnetic disk device 1 includes a head disk assembly (HDA) described later, a driver IC 20, a head amplifier integrated circuit (hereinafter, may be referred to as a head amplifier IC or a preamplifier) 30, a volatile memory 70, and non-volatile memory 80, a buffer memory (buffer) 90, and a system controller 130 which is an integrated circuit of a chip. Further, the magnetic disk device 1 is connected to a host system (host) 100.

The HDA has a magnetic disk (hereinafter referred to as a disk) 10, a spindle motor (SPM) 12, an arm 13 on which a head 15 is mounted, and a voice coil motor (VCM) 14. The disk 10 is attached to the spindle motor 12 and rotates by driving the spindle motor 12. The arm 13 and the VCM 14 form an actuator. The actuator controls the movement of the head 15 mounted on the arm 13 to a particular position on the disk 10 by the driving of the VCM 14. The disk 10 and the head 15 may be provided in two or more numbers.

In the disk 10, a user data area 10a which can be used by a user and a system area 10b which records information necessary for system management are allocated in an area where data can be written. Incidentally, in the disk 10, a media cache (may be referred to as a media cache area) which temporarily holds data (or a command) transferred from the host 100 or the like before writing to a particular area of the user data area 10a may be allocated in an area separate from the user data area 10a and the system area 10b. Hereinafter, a direction from the inner circumference to the outer circumference of the disk 10 or a direction from the outer circumference to the inner circumference of the disk 10 is referred to as a radial direction. In the radial direction, the direction from the inner circumference to the outer circumference is referred to as an outer direction (or an outer side), and the direction from the outer circumference to the inner circumference, that is, the direction opposite to the outer direction is referred to as an inner direction (or an inner side). The direction orthogonal to the radial direction of the disk 10 is referred to as a circumferential direction. That is, the circumferential direction corresponds to the direction along the circumference of the disk 10. Further, a particular position of the disk 10 in the radial direction may be referred to as a radial position, and a particular position of the disk 10 in the circumferential direction may be referred to as a circumferential position. The radial position and the circumferential position may be collectively referred to as a position. The disk 10 is divided into a plurality of areas (hereinafter may be referred to as zones or zone areas) at particular radial intervals. In the zone, data can be written at particular radial intervals. In other words, a plurality of tracks can be written in the zone. In the track, data can be written at particular circumferential intervals. In other words, the track includes a plurality of sectors. Incidentally, the "track" is used as various meanings of an area of a plurality of areas obtained by dividing the disk 10 at particular radial intervals, a route of the head 15 at a particular radial position of the disk 10, data extending circumferentially in a particular radial direction of the disk 10, data for a round written on a particular track of the disk 10, data written on a particular track of the disk 10, and the like. The "sector" is used as various meanings of an area of a plurality of areas obtained by dividing a particular track of the disk 10 in the circumferential direction, data written at a particular circumferential position at a particular radial position of the disk 10, data written in a particular sector of the disk 10, and the like. The "radial width of the track" may be referred to as a "track width". Further, the "radial width of the sector" may be referred to as a "sector width".

The head 15 includes a slider as a main body, and a write head 15W and a read head 15R mounted on the slider. The write head 15W writes data to the disk 10. For example, the write head 15W writes a particular track on the disk 10. The read head 15R reads the data recorded on the disk 10. For example, the read head 15R reads a particular track on the disk 10.

Figure 2:
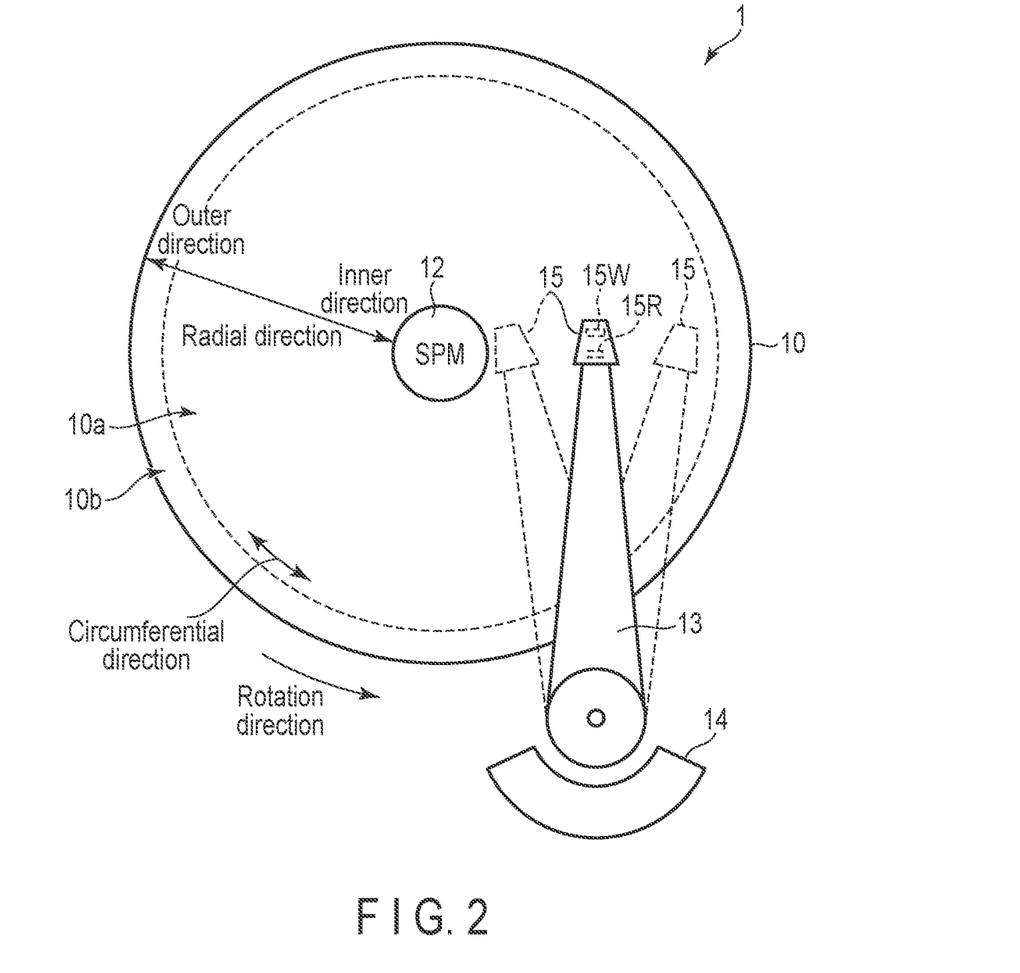
FIG. 2 is a schematic view illustrating an example of an arrangement of a head with respect to the disk according to the embodiment.

FIG. 2 is a schematic view illustrating an example of the arrangement of the head 15 with respect to the disk 10 according to this embodiment. As illustrated in FIG. 2, in the circumferential direction, the direction in which the disk 10 rotates is referred to as a rotation direction. Incidentally, in the example illustrated in FIG. 2, the rotation direction is illustrated as a counterclockwise direction but may be as an opposite (clockwise) direction.

The head 15 is driven by the VCM 14 with respect to the disk 10 to rotate around a rotation axis and move to a particular position from the inside to the outside, or move from the outside to the inside.

In the example illustrated in FIG. 2, in the disk 10, the system area 10b is arranged in the outer direction of the user data area 10a. In the example illustrated in FIG. 2, the system area 10b is arranged on the outermost circumference of the disk 10. Incidentally, the system area 10b may be arranged at a position different from the position illustrated in FIG. 2.

The driver IC 20 controls the driving of the SPM 12 and the VCM 14 according to the control of the system controller 130 (specifically, an MPU 60 described later).

The head amplifier IC (preamplifier) 30 includes a read amplifier and a write driver. The read amplifier amplifies a read signal read from the disk 10 and outputs the signal to the system controller 130 (specifically, a read/write (R/W) channel 60 described later). The write driver outputs a write current corresponding to the write data output from the R/W channel 60 to the head 15.

The volatile memory 70 is a semiconductor memory in which stored data is lost when the power supply is cut off. The volatile memory 70 stores data and the like required for processing in each unit of the magnetic disk device 1. The volatile memory 70 is, for example, a Dynamic Random Access Memory (DRAM) or a Synchronous Dynamic Random Access Memory (SDRAM).

The non-volatile memory 80 is a semiconductor memory which records data stored even when the power supply is cut off. The non-volatile memory 80 is, for example, a NOR type or NAND type Flash Read Only Memory (flash ROM: FROM).

The buffer memory 90 is a semiconductor memory which temporarily records data and the like transmitted and received between the magnetic disk device 1 and the host 100. Incidentally, the buffer memory 90 may be integrally configured with the volatile memory 70. The buffer memory 90 is, for example, a DRAM, a Static Random Access Memory (SRAM), an SDRAM, a Ferroelectric Random Access memory (FeRAM), a Magnetoresistive Random Access Memory (MRAM), or the like.

The system controller (controller) 130 is realized, for example, by using a large-scale integrated circuit (LSI) which is referred to as a System-on-a-Chip (SoC) in which a plurality of elements are integrated on a single chip. The system controller 130 includes a microprocessor (MPU) 40, a hard disk controller (HDC) 50, and a read/write (R/W) channel 60. The system controller 130 is electrically connected to, for example, the driver IC 20, the head amplifier IC 30, the volatile memory 70, the non-volatile memory 80, the buffer memory 90, the host system 100, and the like.

The MPU 40 is a main controller which controls each unit of the magnetic disk device 1. The MPU 40 controls the VCM 14 via the driver IC 20 and executes servo control for positioning the head 15. The MPU 40 controls the SPM 12 via the driver IC 20 and rotates the disk 10. The MPU 40 controls the operation of writing data to the disk 10 and selects the storage destination of the data transferred from the host 100, for example, the write data. In addition, the MPU 40 controls the operation of reading the data from the disk 10 and controls the processing of the data transferred from the disk 10 to the host 100. The MPU 40 may execute processing based on firmware. The MPU 40 is connected to each unit of the magnetic disk device 1. The MPU 40 is electrically connected to, for example, the driver IC 20, the HDC 50, and the R/W channel 60.

The HDC 50 controls the transfer of data. For example, the HDC 50 controls the transfer of data between the host 100 and the disk 10 in response to the instruction from the MPU 40. The HDC 50 is electrically connected to, for example, the MPU 40, the R/W channel 60, the volatile memory 70, the non-volatile memory 80, and the buffer memory 90.

The R/W channel 60 executes signal processing of data (hereinafter, may be referred to as read data) transferred from the disk 10 to the host 100 and data (hereinafter, may be referred to as write data) transferred from the host 100 in response to an instruction from the MPU 40. The R/W channel 60 has a circuit or a function for measuring the signal quality of the read data. The R/W channel 60 is electrically connected to, for example, the head amplifier IC 30, the MPU 40, and the HDC 50.

Hereinafter, in the head 15, the head amplifier IC 30, and the controller 130, the system which transfers the data read from the disk 10 to the host 100 may be referred to as a read system.

Figure 3:
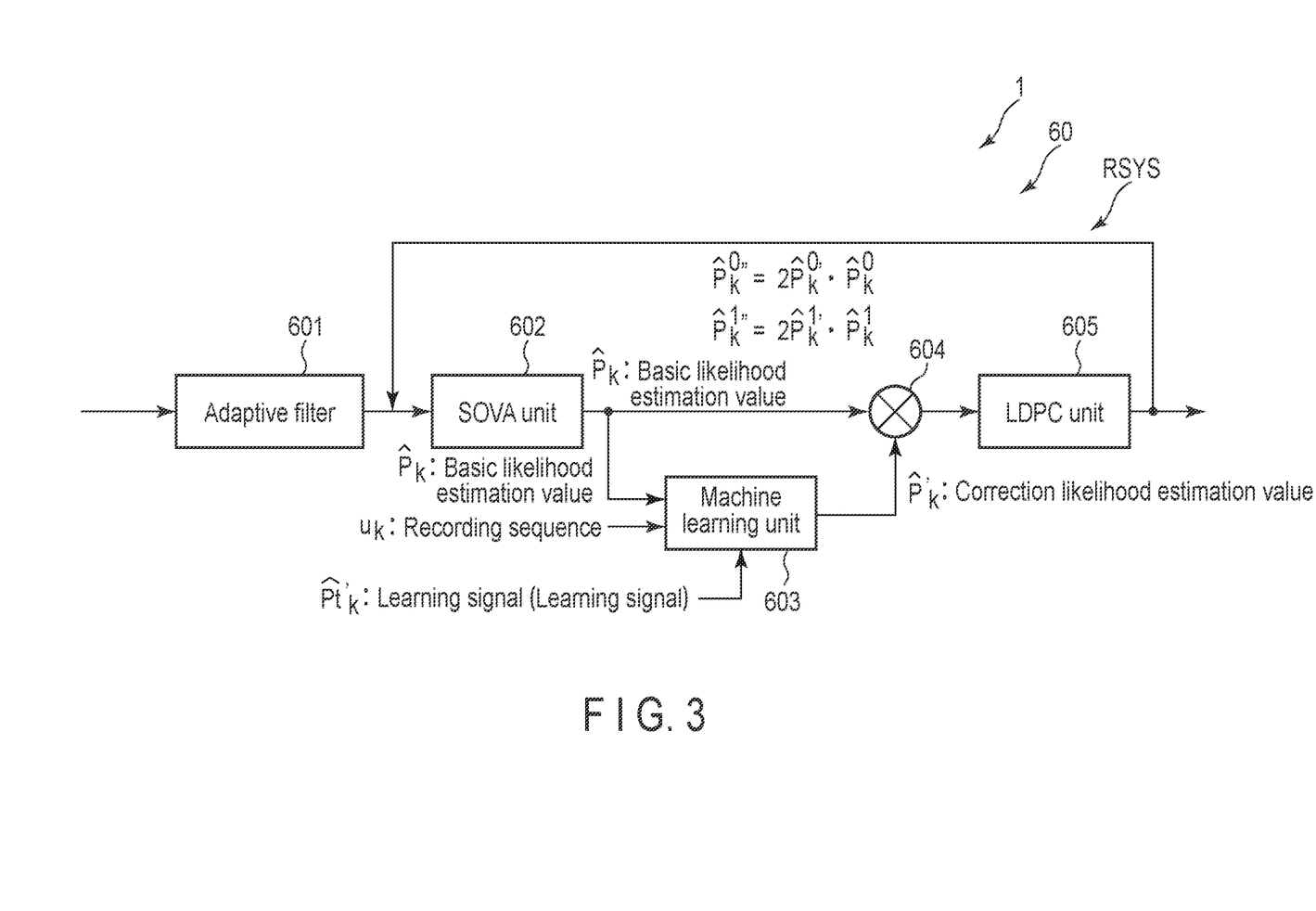
FIG. 3 is a block diagram illustrating an example of a read system of an R/W channel.

FIG. 3 is a block diagram illustrating an example of a read system RSYS of the R/W channel 60.

The R/W channel 60 has, as the read system RSYS, an adaptive filter 601, a Soft Output Viterbi Algorithm (SOVA) unit 602, a machine learning unit 603, a calculation unit 604, and a Low Density Parity Check (LDPC) unit 605. Incidentally, the R/W channel 60 may have, as the read system RSYS, processing units, circuits, and the like other than the adaptive filter 601, the SOVA unit 602, the machine learning unit 603, the calculation unit 604, and the LDPC unit 605. Further, the adaptive filter 601, the SOVA unit 602, the machine learning unit 603, the calculation unit 604, and the LDPC unit 605 may be provided in other parts of the system controller 130. Each unit of the read system RSYS, for example, the adaptive filter 601, the SOVA unit 602, the machine learning unit 603, the calculation unit 604, and the LDPC unit 605 may execute processing under the control of the MPU 40.

The adaptive filter 601 equalizes the waveform of the data input from the head amplifier IC 30 and outputs the result to the SOVA unit 602. For example, the adaptive filter 601 is a Finite impulse response (FIR) filter.

The SOVA unit 602 executes Viterbi decoding processing, for example, Viterbi decoding processing by a Soft Output Viterbi Algorithm on the data input from the adaptive filter

601, and outputs a likelihood estimation value, a likelihood value, or a likelihood (hereinafter, may be referred to as a basic likelihood estimation value) calculated by the Viterbi decoding processing to the machine learning unit 603 and the calculation unit 604. In the example illustrated in FIG. 3, the SOVA unit 602 executes the Viterbi decoding processing by the SOVA on the data input from the adaptive filter 601 to calculate the basic likelihood estimation value corresponding to a Galois field GF(2) (0 or 1) and outputs the basic likelihood estimation value corresponding to the calculated Galois field GF(2) to the machine learning unit 603 and the calculation unit 604. The likelihood estimation value, the likelihood value, and the likelihood correspond to, for example, a probability and are 0 or more and 1 or less, or 0% or more and 100% or less.

The Machine Learning unit 603 includes, for example, a neural network. The machine learning unit 603 executes machine learning. The machine learning unit 603 executes machine learning based on, for example, an uncorrected basic likelihood estimation value input from the SOVA unit 602, a recording sequence of correct bit data or ideal bit data (hereinafter, a correct or ideal bit sequence), and a learning signal, and outputs the basic likelihood estimation value (hereinafter, also referred to as a correction likelihood estimation value) corrected by machine learning to the calculation unit 604. The machine learning unit 603 executes machine learning based on, for example, the basic likelihood estimation value input from the SOVA unit 602, the recording sequence, and the learning signal, converts the correction likelihood estimation value corrected by the machine learning to unify scales by scaling (standardization and regularization), and outputs the result to the calculation unit 604.

In the example illustrated in FIG. 3, the machine learning unit 603 performs machine learning with scaling the basic likelihood estimation value based on the basic likelihood estimation value input from the SOVA unit 602, the recording sequence of the correct bit data, and the learning signal and outputs the correction likelihood estimation value corrected by the machine learning to the calculation unit 604. The learning signal is expressed by, for example, a Log-likelihood-ratio (LLR). In the machine learning, one bit is expressed by one value called the LLR for simplification. An LLRt (hereinafter, may be referred to as a learning LLR) corresponding to the learning signal is expressed by following Equation (1).

$$LLRt = \log\left(\frac{\hat{Pt}_k^{1'}}{\hat{Pt}_k^{0'}}\right) \qquad \text{Equation (1)}$$

Here, the LLRt corresponds to the learning LLR, k is the time for each bit (GF(2)), $\hat{Pt}_k^{0'}$ corresponds to the learning signal and is a correction likelihood estimation value (hereinafter, may be referred to as a target correction likelihood estimation value of 0) in which target bit data is 0, and $\hat{Pt}_k^{1'}$ corresponds to the learning signal and is a correction likelihood estimation value (hereinafter, may be referred to as a target correction likelihood estimation value of 1) in which target bit data in the case of the recording sequence $u_k=1$ is 1.

In a case where the recording sequence of the correct bit data is 0, the target correction likelihood estimation value of 0 corresponds to the learning signal (hereinafter, may be referred to as a correct learning signal) corresponding to the recording sequence of the correct bit data and the target correction likelihood estimation value (hereinafter, may be referred to as a correct 0 target correction likelihood estimation value) of 0 corresponding to the recording sequence of the correct bit data. In a case where the recording sequence of the correct bit data is 1, the target correction likelihood estimation value of 1 corresponds to the correct learning signal and the target correction likelihood estimation value (hereinafter, may be referred to as a correct 1 target correction likelihood estimation value) of 1 corresponding to the recording sequence of the correct bit data. Hereinafter, the "target correction likelihood estimation value of 0" and the "target correction likelihood estimation value of 1" may be referred to as a "target correction likelihood estimation value". "The target correction likelihood estimation value of 0 and the target correction likelihood estimation value of 1 corresponding to the recording sequence of the correct bit data" may also be referred to as "the target correction likelihood estimation value corresponding to the recording sequence of the correct bit data" or "the correct target correction likelihood estimation value". In addition, "the learning signal corresponding to the recording sequence of the correct bit data" may be referred to as the "correct learning signal".

The target correction likelihood estimation value of 0 is expressed by following Equation (2), and the target correction likelihood estimation value of 1 is expressed by following Equation (3).

$$\hat{Pt}_k^{0'} = \frac{1}{1 + e^{LLR_k}} \qquad \text{Equation (2)}$$

$$\hat{Pt}_k^{1'} = \frac{e^{LLR_k}}{1 + e^{LLR_k}} \qquad \text{Equation (3)}$$

Here, the following equation (4) can be derived based on the equations (2) and (3).

$$\hat{Pt}_k^{0'} + \hat{Pt}_k^{1'} = 1 \qquad \text{Equation (4)}$$

The machine learning unit 603 executes machine learning based on the uncorrected basic likelihood estimation value input from the SOVA unit 602, the recording sequence of the correct bit data, and the learning signal (for example, the learning LLR, the target correction likelihood estimation value of 0, and the target correction likelihood estimation value of 1) and outputs the correction likelihood estimation value obtained by correcting the basic likelihood estimation value with the machine learning to the calculation unit 604. For example, the machine learning unit 603 converts the learning LLR into the target correction likelihood estimation value of 0 and the target correction likelihood estimation value of 1 and executes machine learning based on the uncorrected basic likelihood estimation value input from the SOVA unit 602, the recording sequence of the correct bit data, and the target correction likelihood estimation value of 0, and the target correction likelihood estimation value of 1. For example, the machine learning unit 603 changes and corrects the basic likelihood estimation value to the LLR (hereinafter, may be referred to as a basic LLR) in machine learning, converts the corrected basic LLR (hereinafter, may be referred to as a correction LLR) into the correction likelihood estimation value, and outputs the converted correction likelihood estimation value to the calculation unit 604. For example, the machine learning unit 603 executes machine learning based on the basic likelihood estimation value, the recording sequence of the correct bit data, the correct target correction likelihood estimation value set with the likelihood other than 1, and the incorrect (or not a correct answer) target correction likelihood estimation value, which is set with the likelihood other than 0, and outputs the correction likelihood estimation value obtained by correcting the basic likelihood estimation value with the machine learning to the calculation unit 604. For example, the machine learning unit 603 executes machine learning based on the basic likelihood estimation value, the recording sequence of the correct bit data, the correct target correction likelihood estimation value set with the likelihood other than 1 and other than 0, and the incorrect target correction likelihood estimation value set with the likelihood other than 1 and other than 0, and outputs the correction likelihood estimation value obtained by correcting the basic likelihood estimation value with the machine learning to the calculation unit 604. For example, the machine learning unit 603 executes machine learning based on the basic likelihood estimation value, the recording sequence of the correct bit data, the correct target correction likelihood estimation value set with the likelihood of 0.5 to 0.6, and the incorrect target correction likelihood estimation value set with the likelihood of 0.4 to 0.5, and outputs the correction likelihood estimation value obtained by correcting the basic likelihood estimation value with the machine learning to the calculation unit 604. The value of the learning signal can be freely set by the internal register of the R/W channel 60. For example, the learning signal may be set to be a different value for each of the head 15, the disk 10, and a particular area of the disk 10, for example, the zone by the internal register of the R/W channel 60.

The calculation unit 604 calculates the input value and outputs the calculated value to the LDPC unit 605. In the example illustrated in FIG. 3, the calculation unit 604 integrates the basic likelihood estimation value input from the SOVA unit 602 and the correction likelihood estimation value input from the machine learning unit 603, and outputs the likelihood estimation value (hereinafter, may be referred to as an adjusted likelihood estimation value) obtained by integrating the basic likelihood estimation value and the correction likelihood estimation value to the LDPC unit 605. The adjusted likelihood estimation value (hereinafter, may be referred to as an adjusted likelihood estimation value of 0) in which the bit data in the adjusted likelihood estimation value is 0 is expressed by following Equation (5), and the adjusted likelihood estimation value (hereinafter, may be referred to as an adjusted likelihood estimation value of 1) in which the bit data in the adjusted likelihood estimation value is 1 is expressed by following Equation (6).

$$\hat{P}_k^{0\prime\prime} = 2\hat{P}_k^{0\prime} \cdot \hat{P}_k^{0}$$ Equation (5)

Herein, $\hat{P}_k^{0}$ is a basic likelihood estimation value (hereinafter, may be referred to the basic likelihood estimation value of 0) in which the bit data in the uncorrected basic likelihood estimation value $\hat{P}_k$ output from the SOVA unit 602 is 0, $\hat{P}_k^{0\prime}$ is a correction likelihood estimation value (hereinafter, may be referred to as the correction likelihood estimation value of 0) in which the bit data in the correction likelihood estimation value $\hat{P}_k'$ output from the machine learning unit 603 is 0, and $\hat{P}_k^{0\prime\prime}$ is an adjusted likelihood estimation value (hereinafter, may be referred to as the adjusted likelihood estimation value of 0) in which the bit data in the adjusted likelihood estimation value is 0.

$$\hat{P}_k^{1\prime\prime} = 2\hat{P}_k^{1\prime} \cdot \hat{P}_k^{1}$$ Equation (6)

Herein, $\hat{P}_k^{1}$ is a likelihood estimation value (hereinafter, may be referred to the likelihood estimation value of 1) in which the bit data in the uncorrected basic likelihood estimation value $\hat{P}_k$ output from the SOVA unit 602 is 1, $\hat{P}_k^{1\prime}$ is a correction likelihood estimation value (hereinafter, may be referred to as the correction likelihood estimation value of 1) in which the bit data in the correction likelihood estimation value $\hat{P}_k'$ output from the machine learning unit 603 is 1, and $\hat{P}_k^{1\prime\prime}$ is an adjusted likelihood estimation value (hereinafter, may be referred to as the adjusted likelihood estimation value of 1) in which the bit data in the adjusted likelihood estimation value is 1.

The LDPC unit 605 executes error correction processing, for example, LDPC processing on the data input from the calculation unit 604, and outputs the data obtained by the low density parity check (LDPC) processing to the HDC 50. The LDPC unit 605 executes LDPC processing on the adjusted likelihood estimation value input from the calculation unit 604, and outputs the adjusted likelihood estimation value obtained by executing the LDPC processing to the HDC 50.

Figure 4:
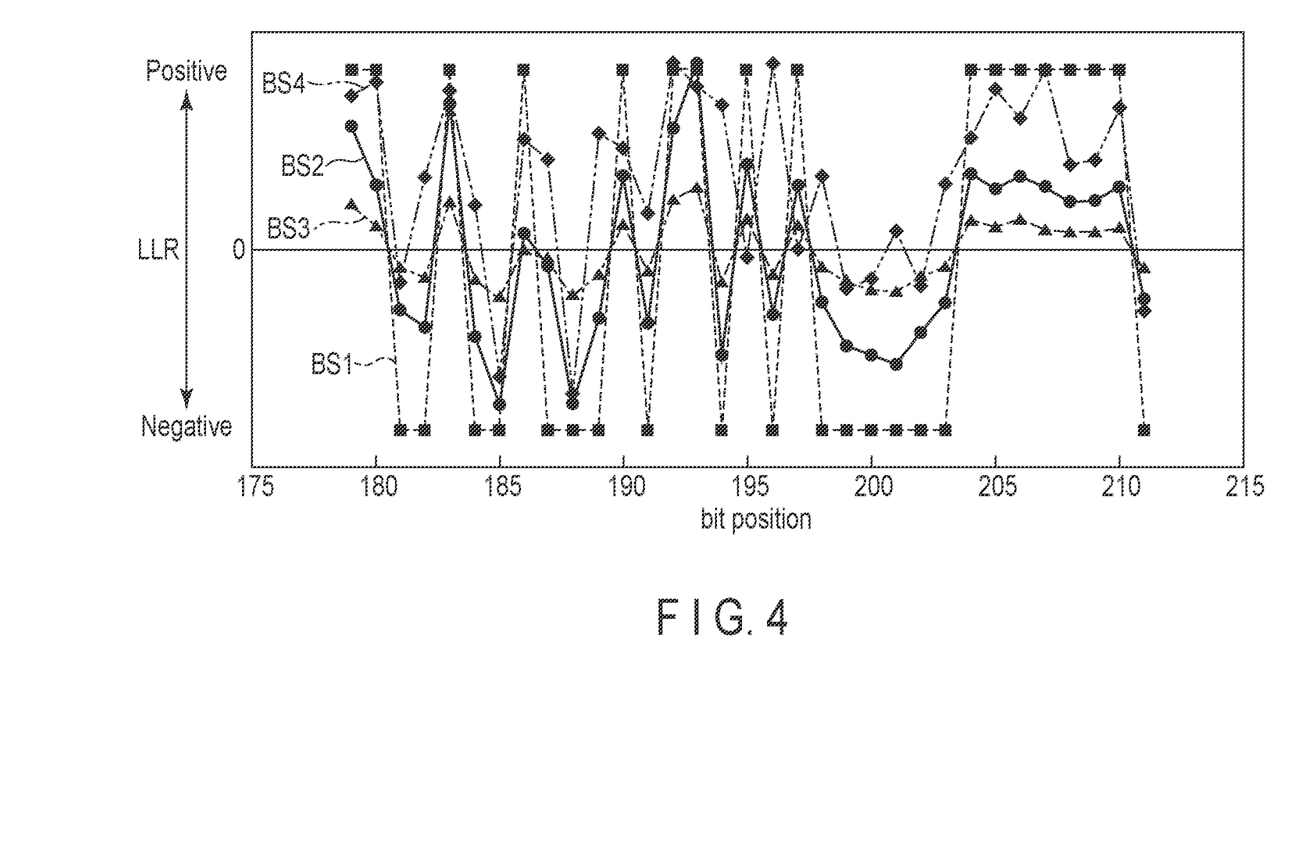
FIG. 4 is a schematic diagram illustrating a change of an LLR with respect to a bit position.

FIG. 4 is a schematic diagram illustrating a change of the LLR with respect to a bit position. In FIG. 4, the horizontal axis represents the bit position, and the vertical axis represents the LLR. In the vertical axis of FIG. 4, the LLR increases in the direction of the positive value toward the direction of the tip of the positive arrow, and increases in the direction of the negative value toward the direction of the tip of the negative arrow. FIG. 4 shows a change BS1 (hereinafter, may be referred to as a bit sequence) in the LLR with respect to the correct (or ideal) bit position, a bit sequence BS2 corresponding to the basic likelihood estimation value output from the SOVA 602, a bit sequence BS3 corresponding to the correction likelihood estimation value corrected by machine learning with the learning LLR (ideal or LLRt) set to 0.1, and a bit sequence BS4 corresponding to the correction likelihood estimation value corrected by machine learning with the learning LLR (ideal or LLRt) set to 100. In a case where the learning LLR (ideal or LLRt) is set to 0.1, the target correction likelihood estimation value is 0.475 from Equations (2) and (3). For example, in a case where the recording sequence of the correct bit data is 0, and the learning LLR is set to LLRt=0.1, the correct 0 target correction likelihood estimation value is 0.475 from Equation (2), and the target correction likelihood estimation value of 1 is 0.525 from Equation (2). For example, in a case where the recording sequence of the correct bit data is 1, and the learning LLR is set to LLRt=0.1, the correct 1 target correction likelihood estimation value is 0.475 from Equation (2), and the target correction likelihood estimation value of 0 is 0.525 from Equation (2). Further, in a case where the learning LLR (ideal or LLRt) is set to 100, the target correction likelihood estimation value is 1 from Equations (2) and (3). For example, in a case where the recording sequence of the correct bit data is 0, and the learning LLR is set to LLRt=100, the correct 0 target correction likelihood estimation value is 1 from Equation (2), and the target correction likelihood estimation value of 1 is 0. For example, in a case where the recording sequence of the correct bit data is 1, and the learning LLR is set to LLRt=100, the correct 1 target correction likelihood estimation value is 1 from Equation (2), and the target correction likelihood estimation value of 0 is 0.

In the example illustrated in FIG. 4, the bit sequence BS4 has a significantly different polarity from the bit sequence BS1. Generally, as shown by the bit sequence BS4 in FIG. 4, in a case where the recording sequence of the correct bit data is 0, the correct 0 target correction likelihood estimation value is set to 1, and the target correction likelihood estimation value of 1 is set to 0, and in a case where the recording sequence of the correct bit data is set to 1, the target correction likelihood estimation value of 0 is set to 0, and the correct 1 target correction likelihood estimation value is set to 1. In the machine learning corresponding to the bit sequence BS4, the difference between the bit sequence BS4 and the bit sequence BS1 is large, and a large value is specified as the absolute value of the learning LLR. Thus, the influence on adjacent signals becomes large, a polarity is different from that of the bit sequence BS1, and the correction with a large absolute value can be executed. Therefore, the LDPC processing based on the correction likelihood estimation value corrected by the machine learning corresponding to the bit sequence BS4 may have a large deterioration in characteristics. In this case, the sector error rate (SER) may be 0 since the LDPC processing is not executed at all.

In the example illustrated in FIG. 4, the bit sequence BS3 has almost the same polarity as the bit sequence BS1. Therefore, the LDPC processing based on the correction likelihood estimation value corrected by the machine learning corresponding to the bit sequence BS3 can improve the sector error rate.

Figure 5:
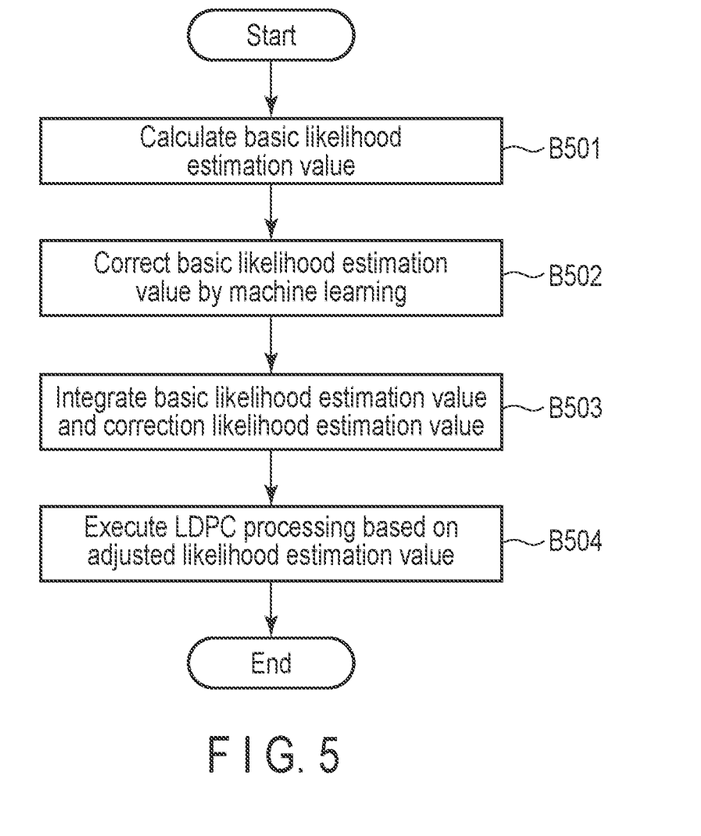
FIG. 5 is a flowchart illustrating an example of a read processing method according to the embodiment.

FIG. 5 is a flowchart illustrating an example of a read processing method according to this embodiment.

The system controller 130 calculates the basic likelihood estimation value (B501) and performs machine learning based on the basic likelihood estimation value, the recording sequence of the correct data bit, and the learning signal to correct the basic likelihood estimation value to the correction likelihood estimation value by the machine learning (B502). For example, the system controller 130 executes machine learning based on the basic likelihood estimation value, the recording sequence of the correct data bit, the correct target correction likelihood estimation value set with the likelihood other than 1, and the incorrect target correction likelihood estimation value set with the likelihood other than 0, and outputs the correction likelihood estimation value obtained by correcting the basic likelihood estimation value by the machine learning with scaling. The system controller 130 integrates the basic likelihood estimation value and the correction likelihood estimation value to calculate the adjusted likelihood estimation value (B503), executes LDPC processing based on the adjusted likelihood estimation value (B504), and ends the processing.

According to this embodiment, the magnetic disk device 1 executes machine learning based on the basic likelihood estimation value, the recording sequence of the correct data bit, the correct target correction likelihood estimation value set with the likelihood other than 1, and the incorrect target correction likelihood estimation value set with the likelihood other than 0. The magnetic disk device 1 executes LDPC processing based on the adjusted likelihood estimation value obtained by integrating the correction likelihood estimation value obtained by correcting the basic likelihood estimation value by machine learning and the basic likelihood estimation value. Therefore, the magnetic disk device 1 can improve the sector error rate. Therefore, the reliability of the magnetic disk device 1 can be improved.

Next, a magnetic disk device according to a modification of the above-described embodiment will be described. In the modification, the same parts as those in the above-described embodiment are designated by the same reference numerals, and detailed description thereof will be omitted.

(First Modification)

A magnetic disk device 1 according to a first modification has a read system different from that of the magnetic disk device 1 of the above-described embodiment.

Figure 6:
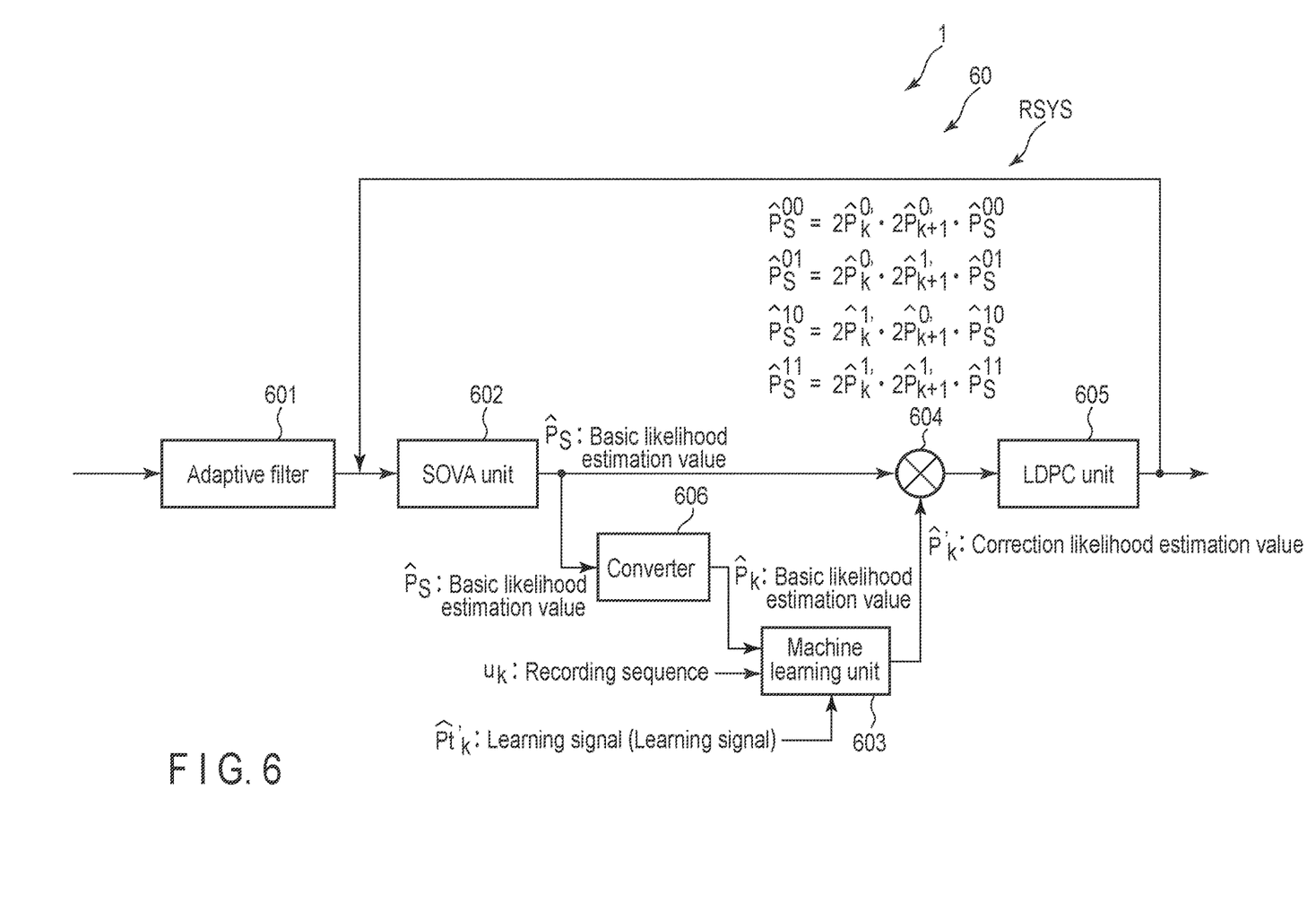
FIG. 6 is a block diagram illustrating an example of a read system of an R/W channel according to a first modification.

FIG. 6 is a block diagram illustrating an example of a read system RSYS of an R/W channel 60 according to the first modification.

The R/W channel 60 further has a converter 606 as the read system RSYS.

The SOVA unit 602 executes Viterbi decoding processing by SOVA on the data input from an adaptive filter 601 and outputs the basic likelihood estimation value calculated by the Viterbi decoding processing to a calculation unit 604 and the converter 606. In the example illustrated in FIG. 6, the SOVA unit 602 executes the Viterbi decoding processing by the SOVA on the data input from the adaptive filter 601 to calculate the basic likelihood estimation value corresponding to a Galois field GF(4) (00 or 10 or 01 or 11) and outputs the basic likelihood estimation value corresponding to the Galois field GF(4) to the converter 606 and the calculation unit 604.

For example, the converter 606 is Symbol2Binary. The converter 606 converts the data input from the SOVA unit 602 from 2 bits to 1 bit and outputs the result to a machine learning unit 603. For example, the converter 606 converts the basic likelihood estimation value corresponding to the Galois field GF(4) input from the SOVA unit 602 into the basic likelihood estimation value corresponding to the Galois field GF(2) and outputs the basic likelihood estimation value corresponding to the converted Galois field GF(2) to the machine learning unit 603.

For example, the machine learning unit 603 executes machine learning based on the uncorrected basic likelihood estimation value input from the converter 606, the recording sequence of the correct bit data, and the learning signal, and scales and outputs the correction likelihood estimation value corrected by the machine learning to the calculation unit 604.

In the example illustrated in FIG. 6, the calculation unit 604 outputs the adjusted likelihood estimation value obtained by integrating the basic likelihood estimation value input from the SOVA unit 602 and the correction likelihood estimation value input from the machine learning unit 603 to the LDPC unit 605. The adjusted likelihood estimation value (hereinafter, may be referred to as an adjusted likelihood estimation value of 00) in which the bit data in the adjusted likelihood estimation value is 00 is expressed by following Equation (7), the adjusted likelihood estimation value (hereinafter, may be referred to as an adjusted likelihood estimation value of 01) in which the bit data in the adjusted likelihood estimation value is 01 is expressed by following Equation (8), the adjusted likelihood estimation value (hereinafter, may be referred to as an adjusted likelihood estimation value of 10) in which the bit data in the adjusted likelihood estimation value is 10 is expressed by following Equation (9), and the adjusted likelihood estimation value (hereinafter, may be referred to as an adjusted likelihood estimation value of 11) in which the bit data in the adjusted likelihood estimation value is 11 is expressed by following Equation (10).

$$\hat{P}_S^{00"} = 2\hat{P}_k^{0'} \cdot 2\hat{P}_{k+1}^{0'} \cdot \hat{P}_S^{00} \qquad \text{Equation (7)}$$

Herein, s is the time for 2 bits (GF(4)), $\hat{P}_S^{00}$ is a basic likelihood estimation value (hereinafter, may be referred to the basic likelihood estimation value of 00) in which the bit data in the basic likelihood estimation value $\hat{P}_S$ corresponding to the Galois field GF(4) output from the SOVA unit 602 is 00, $\hat{P}_{k+1}^{0'}$ is the correction likelihood estimation value of 0 in the correction likelihood estimation value $\hat{P}_{k+1}'$ of time k+1 next to time k output from the machine learning unit 603, and $\hat{P}_S^{00"}$ is an adjusted likelihood estimation value (hereinafter, may be referred to the adjusted likelihood estimation value of 00) in which the bit data in the adjusted likelihood estimation value is 00.

$$\hat{P}_S^{01\prime\prime} = 2\hat{P}_k^{0\prime} \cdot 2\hat{P}_{k+1}^{1\prime} \cdot \hat{P}_S^{01} \quad \text{Equation (8)}$$

Herein, $\hat{P}_S^{01}$ is a basic likelihood estimation value (hereinafter, may be referred to the basic likelihood estimation value of 01) in which the bit data in the basic likelihood estimation value $\hat{P}_S$ corresponding to the Galois field GF(4) output from the SOVA unit 602 is 01, $\hat{P}_{k+1}^{1\prime}$ is the correction likelihood estimation value of 1 in the correction likelihood estimation value $\hat{P}_{k+1}'$ of time k+1 output from the machine learning unit 603, and $\hat{P}_S^{01\prime\prime}$ is an adjusted likelihood estimation value (hereinafter, may be referred to the adjusted likelihood estimation value of 01) in which the bit data in the adjusted likelihood estimation value is 01.

$$\hat{P}_S^{10\prime\prime} = 2\hat{P}_k^{1\prime} \cdot 2\hat{P}_{k+1}^{0\prime} \cdot \hat{P}_S^{10} \quad \text{Equation (9)}$$

Herein, $\hat{P}_S^{10}$ is a basic likelihood estimation value (hereinafter, may be referred to the basic likelihood estimation value of 10) in which the bit data in the basic likelihood estimation value $\hat{P}_S$ corresponding to the Galois field GF(4) output from the SOVA unit 602 is 10, and $\hat{P}_S^{10\prime\prime}$ is an adjusted likelihood estimation value (hereinafter, may be referred to the adjusted likelihood estimation value of 10) in which the bit data in the adjusted likelihood estimation value is 10.

$$\hat{P}_S^{11\prime\prime} = 2\hat{P}_k^{1\prime} \cdot 2\hat{P}_{k+1}^{1\prime} \cdot \hat{P}_S^{11} \quad \text{Equation (10)}$$

Herein, $\hat{P}_S^{11}$ is a basic likelihood estimation value (hereinafter, may be referred to the basic likelihood estimation value of 11) in which the bit data in the basic likelihood estimation value $\hat{P}_S$ corresponding to the Galois field GF(4) output from the SOVA unit 602 is 11, and $\hat{P}_S^{11\prime\prime}$ is an adjusted likelihood estimation value (hereinafter, may be referred to the adjusted likelihood estimation value of 11) in which the bit data in the adjusted likelihood estimation value is 11.

Figure 7:
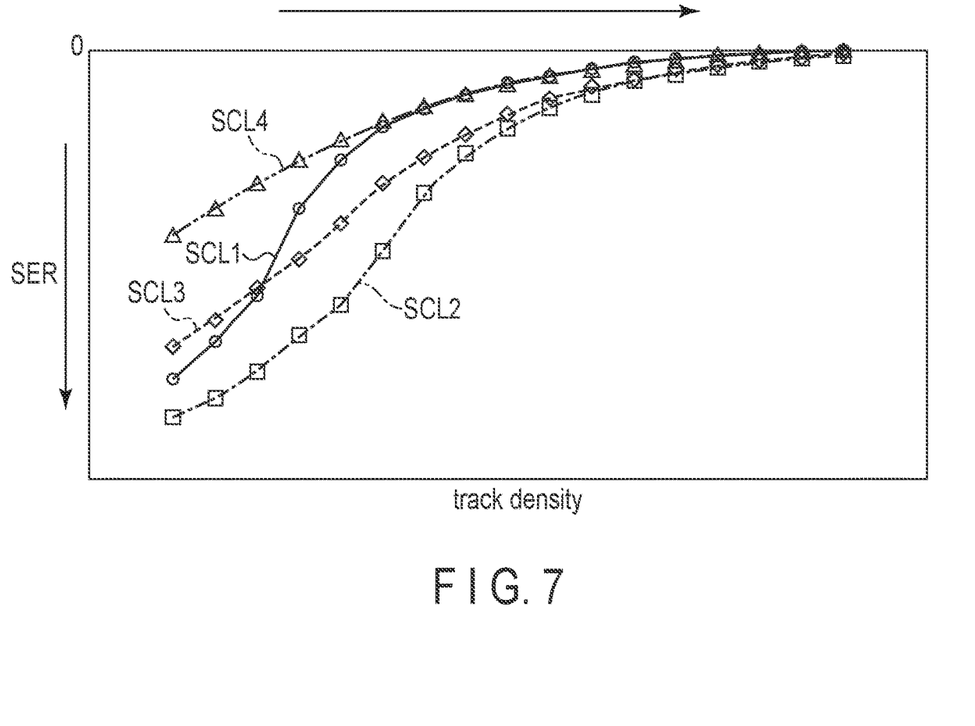
FIG. 7 is a schematic diagram illustrating an example of a change in sector error rate with respect to a track density.

FIG. 7 is a schematic diagram illustrating an example of a change in sector error rate with respect to a track density. In FIG. 7, the horizontal axis represents the track density, and the vertical axis represents the sector error rate (SER). On the horizontal axis of FIG. 7, the track density increases toward the tip side of an arrow and decreases toward the side opposite to the tip side of the arrow. On the vertical axis of FIG. 7, the SER decreases toward the tip side of an arrow and increases toward the side opposite to the tip side of the arrow. FIG. 7 shows a change (hereinafter, may be simply referred to as a change in SER) SCL1 in SER with respect to the track density corresponding to the basic likelihood estimation value output from the SOVA 602, a change SCL2 in SER based on the correction likelihood estimation value corrected by machine learning with the target correction likelihood estimation value set to 0.475, a change SCL3 in SER based on the correction likelihood estimation value corrected by machine learning with the target correction likelihood estimation value set to 0.426, and a change SCL4 in SER based on the correction likelihood estimation value corrected by machine learning with the target correction likelihood estimation value set to 0.378.

In the example illustrated in FIG. 7, the SER corresponding to the changes SCL2 and SCL3 in SER is improved over the SER corresponding to the change SCL1 in SER. On the other hand, the SER corresponding to the change SCL4 in SER is deteriorated compared to the SER corresponding to the change SCL1 in SER. That is, an adjusted likelihood estimation value is calculated based on the correction likelihood estimation value corrected by machine learning with the target correction likelihood estimation value is set to a value of 0.4 or more, and LDPC processing is executed based on the adjusted likelihood estimation value so that the sector error rate (SER) can be improved. In other words, an adjusted likelihood estimation value is calculated based on the correction likelihood estimation value corrected by machine learning with the target correction likelihood estimation value is set to a value smaller than 0.4, and LDPC processing is executed based on the adjusted likelihood estimation value so that the sector error rate (SER) may be deteriorated.

Figure 8:
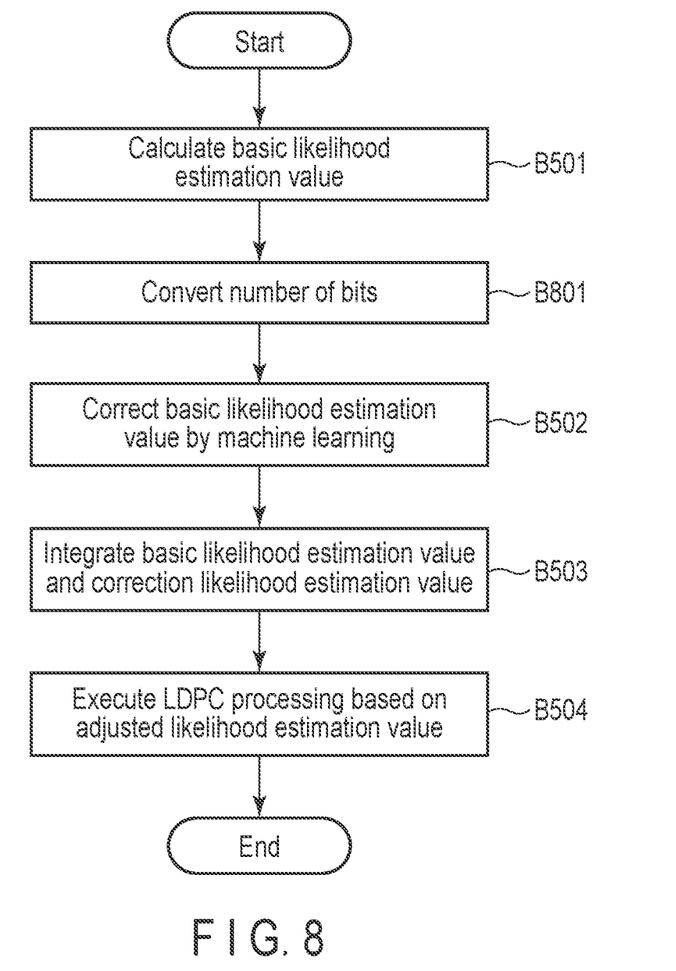
FIG. 8 is a flowchart illustrating an example of a read processing method according to the first modification.

FIG. 8 is a flowchart illustrating an example of a read processing method according to the first modification.

The system controller 130 calculates the basic likelihood estimation value (B501) and converts the number of bits of the basic likelihood estimation value (B801). The system controller 130 performs machine learning based on the basic likelihood estimation value obtained by converting the number of bits, the recording sequence of the correct data bit, and the learning signal to correct the basic likelihood estimation value to the correction likelihood estimation value by the machine learning (B502). The system controller 130 integrates the basic likelihood estimation value and the correction likelihood estimation value to calculate the adjusted likelihood estimation value (B503), executes LDPC processing based on the adjusted likelihood estimation value (B504), and ends the processing.

According to the first modification, the magnetic disk device 1 executes machine learning based on the basic likelihood estimation value corresponding to the Galois field GF(4), the recording sequence of the correct data bit, the correct target correction likelihood estimation value set with the likelihood of 0.4 or more, and the incorrect target correction likelihood estimation value set with the likelihood of 0.4 or more. The magnetic disk device 1 executes LDPC processing based on the adjusted likelihood estimation value obtained by integrating the correction likelihood estimation value obtained by correcting the basic likelihood estimation value by machine learning and the basic likelihood estimation value. Therefore, the magnetic disk device 1 can improve the sector error rate. Therefore, the reliability of the magnetic disk device 1 can be improved.

(Second Modification)

A magnetic disk device 1 according to a second modification has a read system different from that of the magnetic disk device 1 of the above-described embodiment and the first modification.

Figure 9:
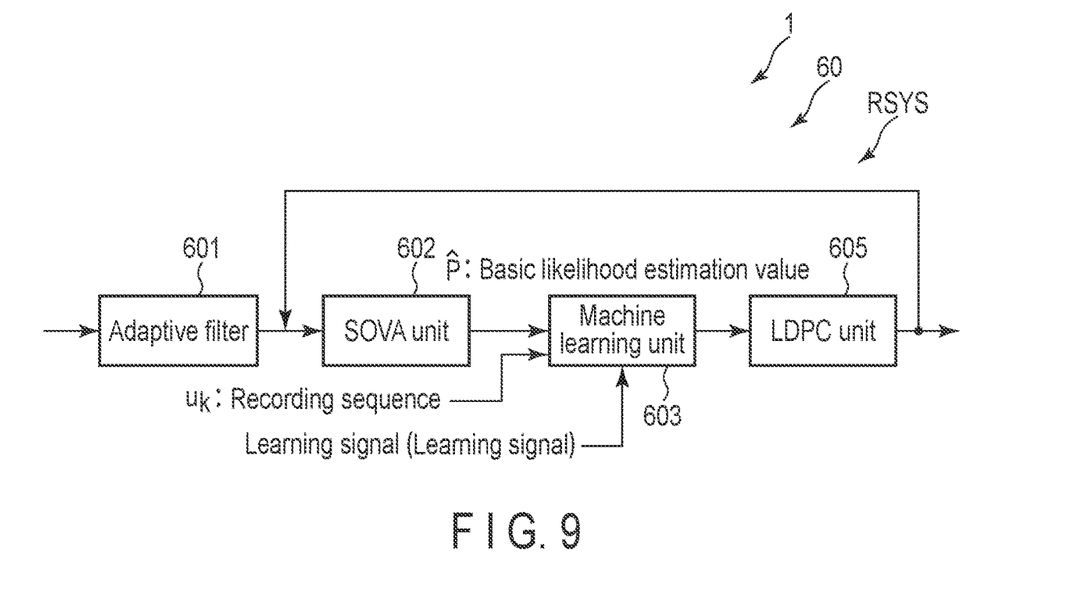
FIG. 9 is a block diagram illustrating an example of a read system of an R/W channel according to a second modification.

FIG. 9 is a block diagram illustrating an example of a read system RSYS of an R/W channel 60 according to the second modification.

The R/W channel 60 has, as the read system RSYS, an adaptive filter 601, a SOVA unit 602, a machine learning unit 603, and an LDPC unit 605.

The SOVA unit 602 executes Viterbi decoding processing by SOVA on the data input from the adaptive filter 601 and outputs the basic likelihood estimation value calculated by the Viterbi decoding processing to the machine learning unit 603.

For example, the machine learning unit 603 executes machine learning based on the basic likelihood estimation value input from the SOVA unit 602, the recording sequence of the correct bit data, and the learning signal, and outputs the adjusted likelihood estimation value corrected by the machine learning to the LDPC unit 605. For example, the machine learning unit 603 executes machine learning based on the basic likelihood estimation value input from the SOVA unit 602, the recording sequence of the correct bit data, and the learning signal, and scales and outputs the adjusted likelihood estimation value corrected by the machine learning to the LDPC unit 605.

The LDPC unit 605 executes LDPC processing on the adjusted likelihood estimation value input from the machine learning unit 603, and outputs the adjusted likelihood estimation value obtained by executing the LDPC processing to the HDC 50.

Figure 10:
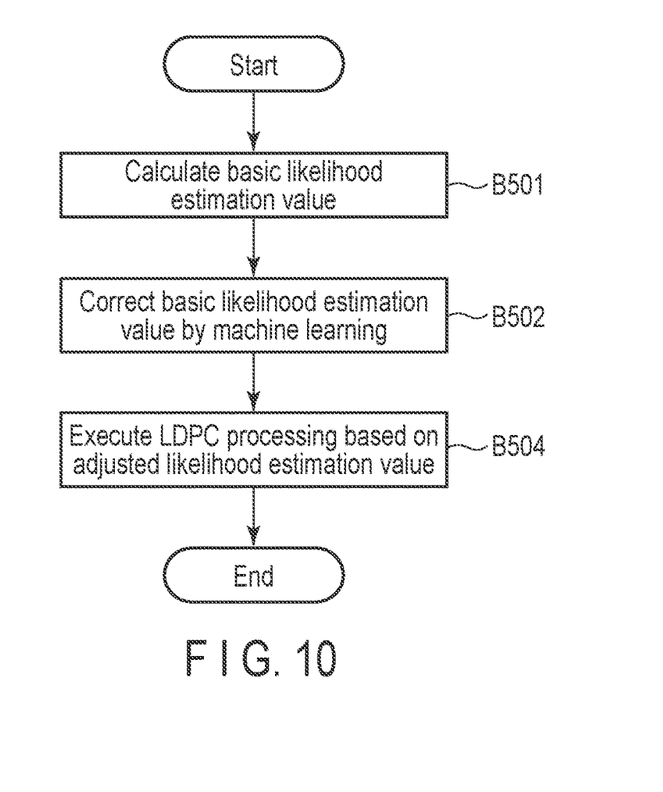
FIG. 10 is a flowchart illustrating an example of a read processing method according to the second modification.

FIG. 10 is a flowchart illustrating an example of a read processing method according to the second modification.

A system controller 130 calculates the basic likelihood estimation value (B501) and performs machine learning based on the basic likelihood estimation value, the recording sequence of the correct data bit, and the learning signal to correct the basic likelihood estimation value to the adjusted likelihood estimation value by the machine learning (B502). The system controller 130 executes LDPC processing based on the adjusted likelihood estimation value (B504), and ends the processing.

According to the second modification, the magnetic disk device 1 calculates the basic likelihood estimation value and performs machine learning based on the basic likelihood estimation value, the recording sequence of the correct data bit, and the learning signal to correct the basic likelihood estimation value to the adjusted likelihood estimation value by the machine learning. The system controller 130 executes LDPC processing based on the adjusted likelihood estimation value. Therefore, the magnetic disk device 1 can improve the sector error rate. Therefore, the reliability of the magnetic disk device 1 can be improved.

(Third Modification)

A magnetic disk device 1 according to a third modification has a read system different from that of the magnetic disk device 1 of the above-described embodiment and the first modification.

Figure 11:
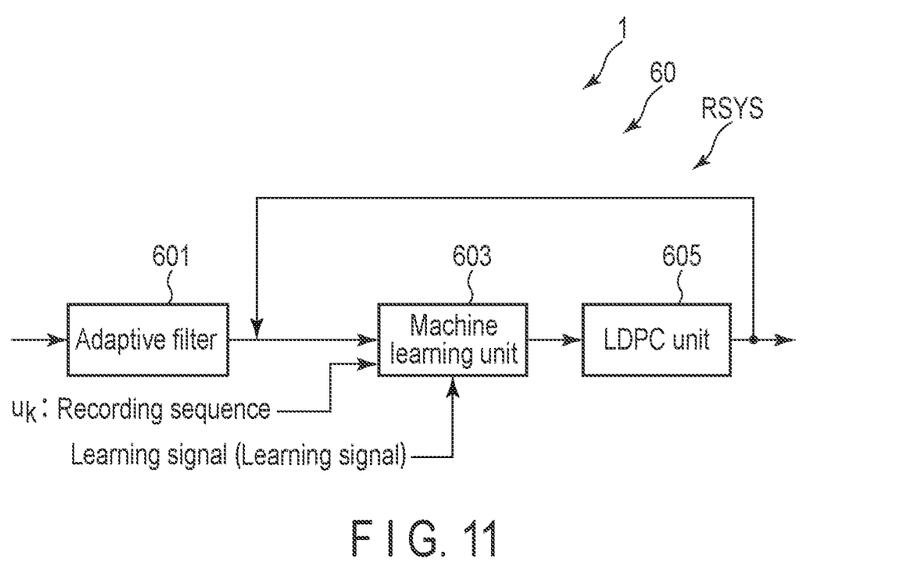
FIG. 11 is a block diagram illustrating an example of a read system of an R/W channel according to a third modification.

FIG. 11 is a block diagram illustrating an example of a read system RSYS of an R/W channel 60 according to the third modification.

The R/W channel 60 has, as the read system RSYS, an adaptive filter 601, a machine learning unit 603, and an LDPC unit 605.

The adaptive filter 601 equalizes the waveform of the data input from the head amplifier IC 30 and outputs the result to the machine learning unit 603. For example, the adaptive filter 601 is a Finite impulse response (FIR) filter.

For example, the machine learning unit 603 executes machine learning based on the data (may be referred to as a signal) input from the adaptive filter 601, the recording sequence of the correct bit data, and the learning signal, and outputs the adjusted likelihood estimation value corrected by the machine learning to the LDPC unit 605. For example, the machine learning unit 603 executes machine learning based on the data input from the adaptive filter 601, the recording sequence of the correct bit data, and the learning signal, and scales and outputs the adjusted likelihood estimation value corrected by the machine learning to the LDPC unit 605.

The LDPC unit 605 executes LDPC processing on the adjusted likelihood estimation value input from the machine learning unit 603, and outputs the adjusted likelihood estimation value obtained by executing the LDPC processing to the HDC 50.

Figure 12:
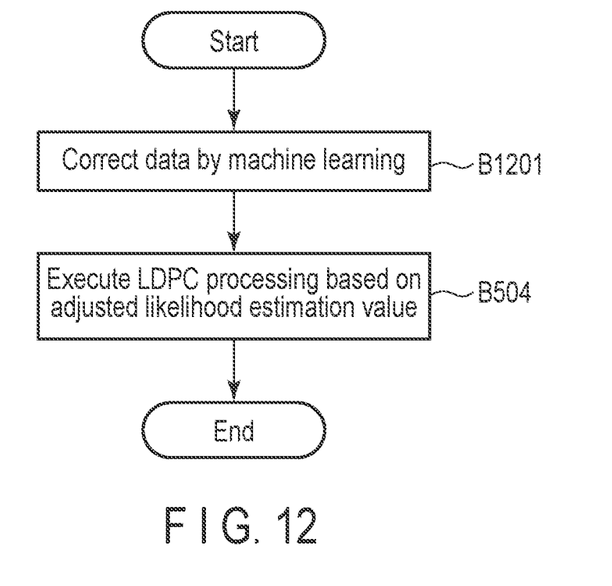
FIG. 12 is a flowchart illustrating an example of a read processing method according to the third modification.

FIG. 12 is a flowchart illustrating an example of a read processing method according to the third modification.

A system controller 130 performs machine learning based on the data input from the adaptive filter 601, the recording sequence of the correct data bit, and the learning signal to correct the data input from the adaptive filter 601 to the adjusted likelihood estimation value by the machine learning (B1201). The system controller 130 executes LDPC processing based on the adjusted likelihood estimation value (B504), and ends the processing.

According to the third modification, the magnetic disk device 1 performs machine learning based on the data input from the adaptive filter 601, the recording sequence of the correct data bit, and the learning signal to correct the data input from the adaptive filter 601 to the adjusted likelihood estimation value (B1201). The magnetic disk device 1 executes LDPC processing based on the adjusted likelihood estimation value (B504), and ends the processing. Therefore, the magnetic disk device 1 can improve the sector error rate. Therefore, the reliability of the magnetic disk device 1 can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
    a disk;
    a head that writes data to the disk and reads data from the disk; and
    a controller that corrects a first signal into a first likelihood value by machine learning based on a correct learning signal set with a likelihood other than 1 and an incorrect learning signal set with a likelihood other than 0 and executes error correction processing based on a second likelihood value according to the first signal and the first likelihood value.

2. The magnetic disk device according to claim 1, wherein the correct learning signal and the incorrect learning signal are 0.4 or more.

3. The magnetic disk device according to claim 1, wherein the correct learning signal has a likelihood of 0.5 or more and 0.6 or less, and the incorrect learning signal has a likelihood of 0.4 or more and 0.5 or less.

4. The magnetic disk device according to claim 1, wherein the controller converts the first signal into a first LLR, and converts a second LLR obtained by correcting the first LLR into the first likelihood value.

5. The magnetic disk device according to claim 1, wherein the controller scales the first likelihood value in the machine learning.

6. The magnetic disk device according to claim 1, wherein the second likelihood value is a product of the first signal and the first likelihood value.

7. The magnetic disk device according to claim 1, wherein the controller calculates the first signal by Viterbi decoding processing by SOVA.

8. The magnetic disk device according to claim 1, wherein the first signal is data output from an FIR filter.

9. The magnetic disk device according to claim 1, wherein the controller executes the machine learning by a neural network.

10. The magnetic disk device according to claim 1, wherein the controller sets the correct learning signal and the incorrect learning signal with different values for each of a plurality of division areas obtained by dividing the disk in a radial direction through a register.

11. A read processing method for a magnetic disk device which includes a disk and a head that writes data to the disk and reads data from the disk, the method comprising:

correcting a first signal into a first likelihood value by machine learning based on a correct learning signal set with a likelihood other than 1 and an incorrect learning signal set with a likelihood other than 0; and executing error correction processing based on a second likelihood value according to the first signal and the first likelihood value.

12. The read processing method according to claim 11, wherein the correct learning signal and the incorrect learning signal are 0.4 or more.

13. The read processing method according to claim 11, wherein the correct learning signal has a likelihood of 0.5 or more and 0.6 or less, and the incorrect learning signal has a likelihood of 0.4 or more and 0.5 or less.

14. The read processing method according to claim 11, further comprising:

converting the first signal into a first LLR; and
converting a second LLR obtained by correcting the first LLR into the first likelihood value.

15. The read processing method according to claim 11, further comprising: scaling the first likelihood value in the machine learning.

16. The read processing method according to claim 11, wherein the second likelihood value is a product of the first signal and the first likelihood value.

17. The read processing method according to claim 11, further comprising: calculating the first signal by Viterbi decoding processing by SOVA.

18. The read processing method according to claim 11, wherein the first signal is data output from an FIR filter.

19. The read processing method according to claim 11, further comprising: executing the machine learning by a neural network.

20. The read processing method according to claim 11, further comprising: setting the correct learning signal and the incorrect learning signal with different values for each of a plurality of division areas obtained by dividing the disk in a radial direction through a register.

* * * * *